United States Patent
Monti et al.

(10) Patent No.: US 12,488,420 B2
(45) Date of Patent: Dec. 2, 2025

(54) IMAGE PROCESSING SYSTEM AND METHOD

(71) Applicant: Sony Interactive Entertainment Inc., Tokyo (JP)

(72) Inventors: Maria Chiara Monti, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 320 days.

(21) Appl. No.: 18/297,029

(22) Filed: Apr. 7, 2023

(65) Prior Publication Data

US 2023/0334623 A1    Oct. 19, 2023

(30) Foreign Application Priority Data

Apr. 13, 2022    (GB) ..................... 2205482

(51) Int. Cl.
| | | |
|---|---|---|
| *G06T 3/4053* | (2024.01) | |
| *G02B 27/01* | (2006.01) | |
| *G06F 3/01* | (2006.01) | |
| *G06T 7/13* | (2017.01) | |

(Continued)

(52) U.S. Cl.
CPC ........ *G06T 3/4053* (2013.01); *G02B 27/0172* (2013.01); *G06F 3/013* (2013.01); *G06T 7/13* (2017.01); *G06T 7/194* (2017.01); *H04N 5/272* (2013.01); *G06T 2207/20036* (2013.01)

(58) Field of Classification Search
CPC ......... G06T 1/20; G06T 3/4007; G06T 3/403; G06T 3/4053; G06T 7/13; G06T 7/194; G06T 15/00; G06T 2200/12; G06T 2207/20036; G06F 3/013; G02B 27/0172; H04N 5/272; H04N 13/344
See application file for complete search history.

(56) References Cited

U.S. PATENT DOCUMENTS

| | | |
|---|---|---|
| 2014/0247277 A1 | 9/2014 | Guenter |
| 2018/0275772 A1 | 9/2018 | Bastani |
| 2018/0293694 A1 | 10/2018 | Labbe |

(Continued)

OTHER PUBLICATIONS

Extended European Search Report for corresponding EP Application 23163200.1, 5 pages, dated Sep. 18, 2023.

(Continued)

*Primary Examiner* — Ryan A Lubit
(74) *Attorney, Agent, or Firm* — Fish & Richardson P.C.

(57) ABSTRACT

A content rendering and display system operable to display content to a viewer, the system comprising a rendering unit operable to render an image having a first resolution in a first render pass, and to generate supplementary information in additional render passes, wherein the rendered image and the supplementary information are stored in a multi-layer image structure, an upsampling unit operable to perform an upsampling process on the rendered image so as to generate an image having a portion at a second resolution higher than the first resolution, wherein the upsampling process comprises a morphological antialiasing process that uses the supplementary information as an input, and a display device operable to display the upsampled image, wherein the supplementary information comprises edge information for the rendered image.

14 Claims, 8 Drawing Sheets

(51) Int. Cl.
  *G06T 7/194* (2017.01)
  *H04N 5/272* (2006.01)

(56) References Cited

U.S. PATENT DOCUMENTS

| | | | |
|---|---|---|---|
| 2019/0043167 A1 | 2/2019 | Steyskal | |
| 2019/0236758 A1* | 8/2019 | Kim | G06T 11/40 |
| 2019/0272028 A1* | 9/2019 | Hong | G06F 1/163 |
| 2020/0098165 A1 | 3/2020 | Gruber | |
| 2020/0135703 A1* | 4/2020 | Ahmed | G02B 30/00 |
| 2020/0342571 A1 | 10/2020 | Young | |
| 2021/0201446 A1* | 7/2021 | Steyskal | G06T 3/4038 |
| 2021/0225049 A1* | 7/2021 | Ritschel | G06F 3/013 |
| 2021/0247607 A1* | 8/2021 | Strandborg | G02B 27/0093 |
| 2021/0274155 A1* | 9/2021 | Yun | H04N 13/398 |
| 2021/0350543 A1 | 11/2021 | Strugar | |
| 2021/0356744 A1 | 11/2021 | Kempf | |
| 2021/0366082 A1 | 11/2021 | Xiao | |
| 2021/0366194 A1* | 11/2021 | Han | G06F 3/012 |
| 2022/0075199 A1* | 3/2022 | Trisnadi | G02B 27/0176 |

OTHER PUBLICATIONS

Combined Search and Examination Report for corresponding GB Application 2205482.9, 6 pages, dated Oct. 14, 2022.

\* cited by examiner

IMAGE PROCESSING SYSTEM AND METHOD

BACKGROUND OF THE INVENTION

Field of the Invention

This disclosure relates to an image processing system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The provision of high-quality image content has been a long-standing problem in content display contexts, with improvements being made constantly. Some of these improvements are realised with improved display devices—such as televisions with increased resolution enabling the display of more detailed imagery, and HDR (high dynamic range) capabilities enabling the display of a greater range of luminances. Other improvements have come with the increasing processing capabilities that are available to a content provider—for instance, increased processing power of games consoles has enabled the generation of more detailed virtual environments.

Increases to image quality may be considered particularly important in some arrangements, such as HMD (head-mountable display) arrangements in which users are intended to be provided with high-quality imagery so as to increase the immersiveness of a virtual or augmented reality experience.

However, with increases in image quality there is generally a corresponding increase in the amount of data required to represent that image. This can lead to significantly increased bandwidth requirements for transmitting such content, for instance, which can lead to implementation issues. Similarly, there can be an increasing in the processing required to generate such content which can lead to an increase in the latency between generating and displaying an image.

Foveated rendering is an example of a technique that has been proposed to address such issues. Foveal rendering techniques use information about the gaze direction of a user to determine which portions of an image should be rendered with a high image quality, with areas not being focused upon by a user being able to be rendered at a lower image quality. This enables the overall data size of an image to be reduced, without a significant impact on the subjective image quality experienced by a user.

In a similar vein, other techniques have been proposed which enable images to be generated with varying resolutions in different areas of an image. In some cases, these techniques can be used to provide a smooth resolution gradient throughout an image. Some of these techniques can offer a hardware-based implementation of variable quality for an image, and can be used in conjunction with other techniques such as foveated rendering.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
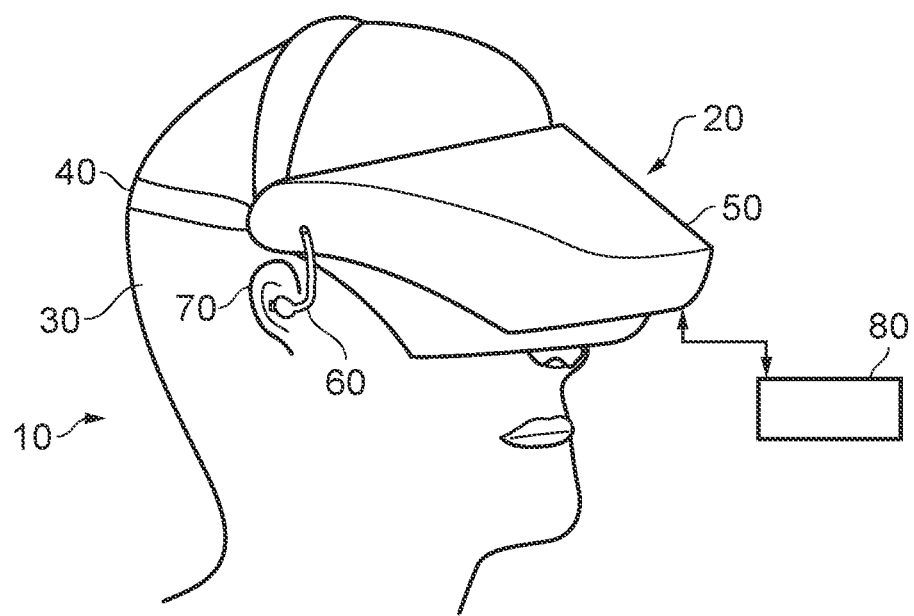
FIG. 1 schematically illustrates an HMD worn by a user.

Referring now to the drawings, wherein like reference numerals designate identical or corresponding parts throughout the several views, embodiments of the present disclosure are described. Firstly, discussion of a system in which gaze tracking is used to determine a user's point of focus on an HMD is described—this is an example of a system which may utilise embodiments of the present disclosure, but embodiments need not be limited to HMD and foveated rendering implementations.

Referring now to FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example: (a) an HMD having its own power supply (as part of the HMD arrangement) but a cabled connection to a video and/or audio signal source; (b) an HMD having a cabled connection to a power supply and to a video and/or audio signal source, embodied as a single physical cable or more than one physical cable; (c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
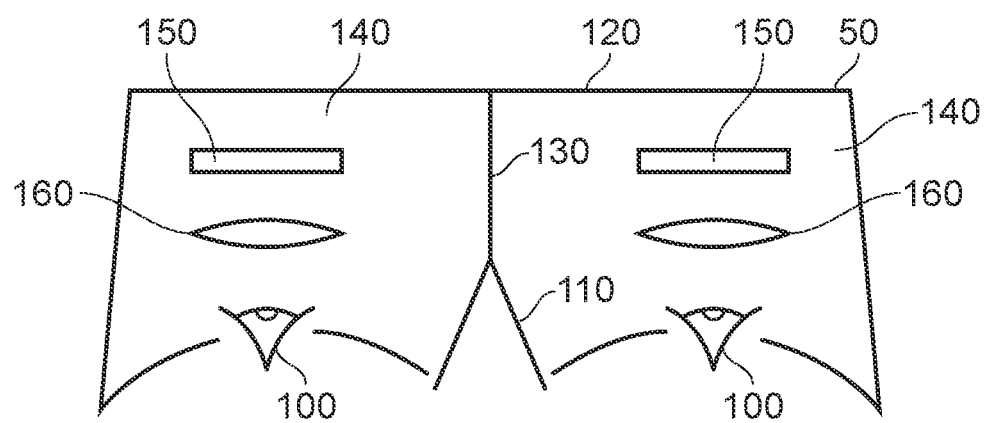
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
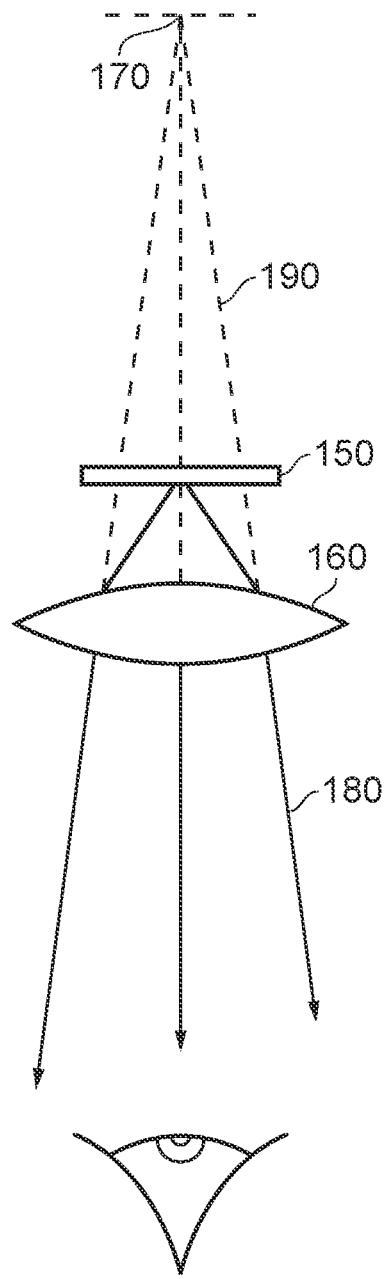
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
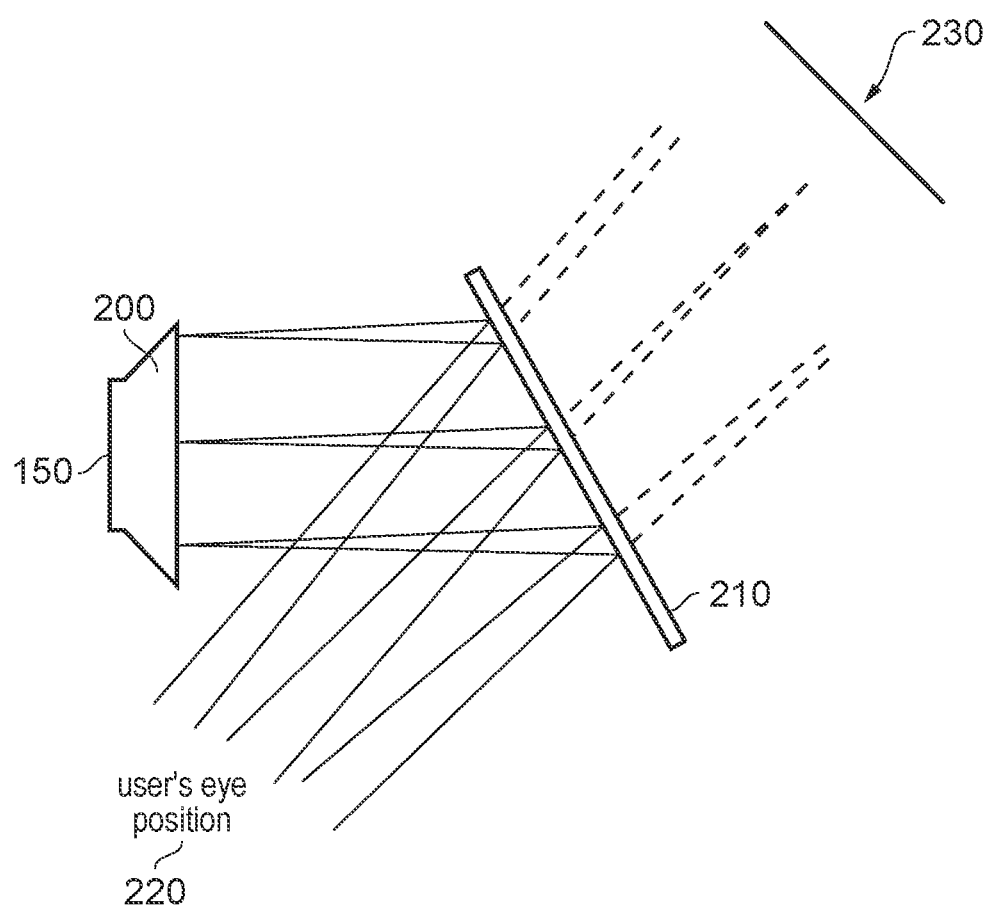
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
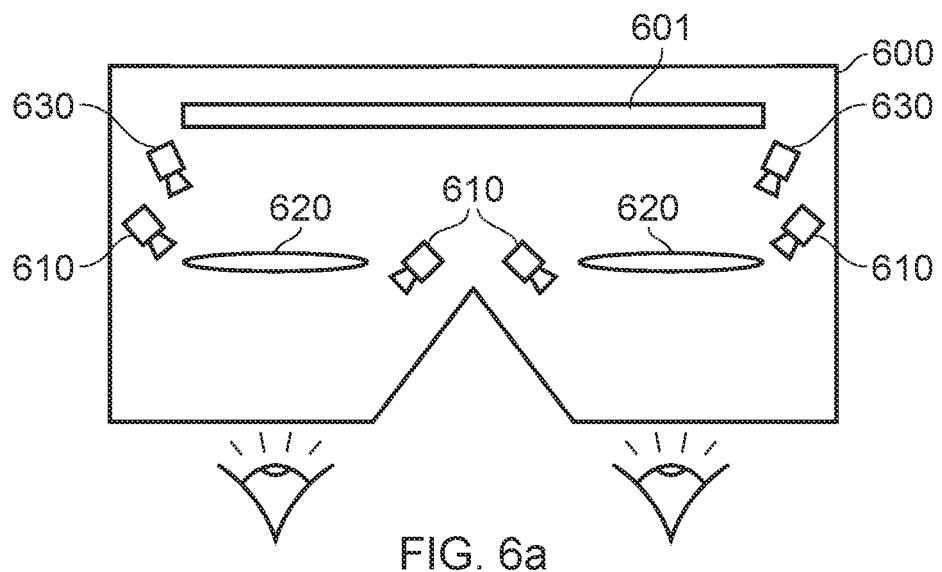
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 (with a display element 601) is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
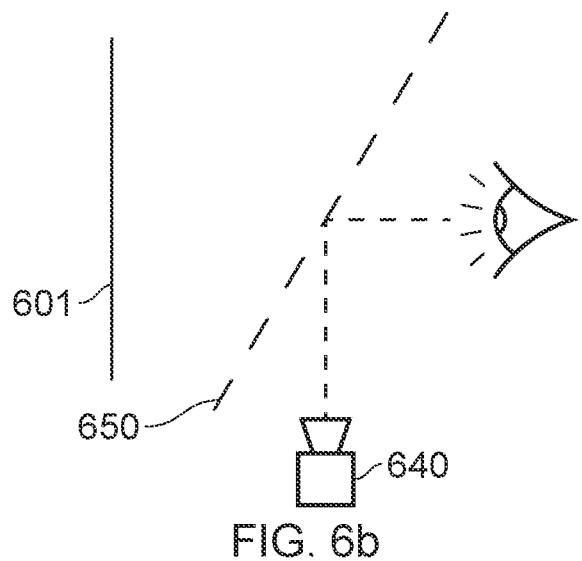
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
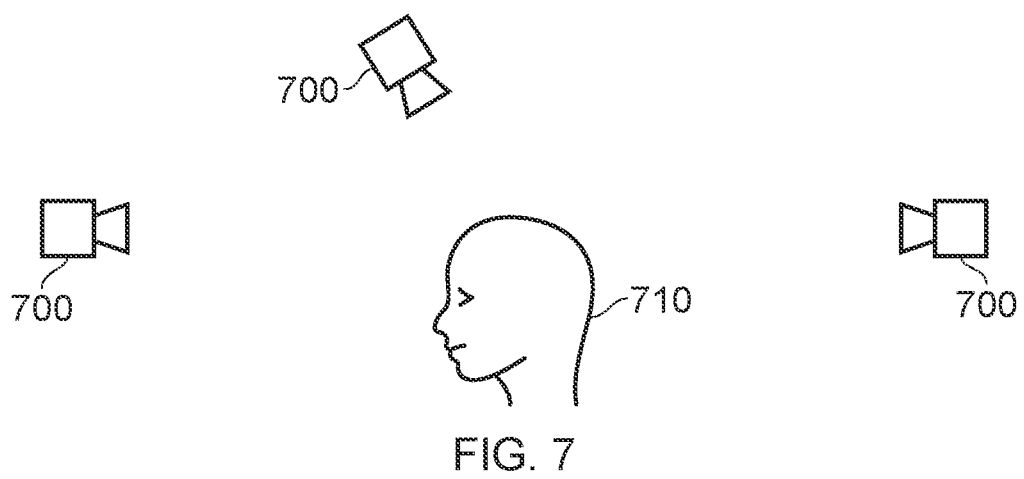
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
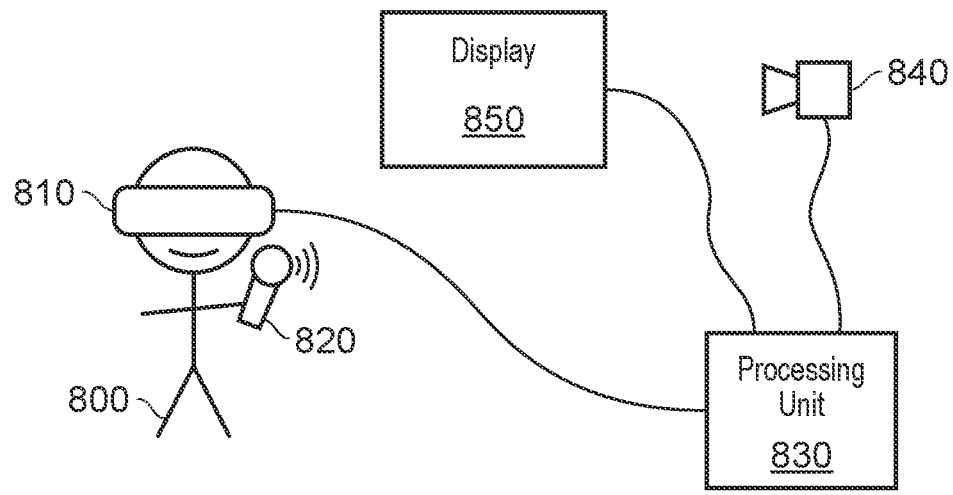
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
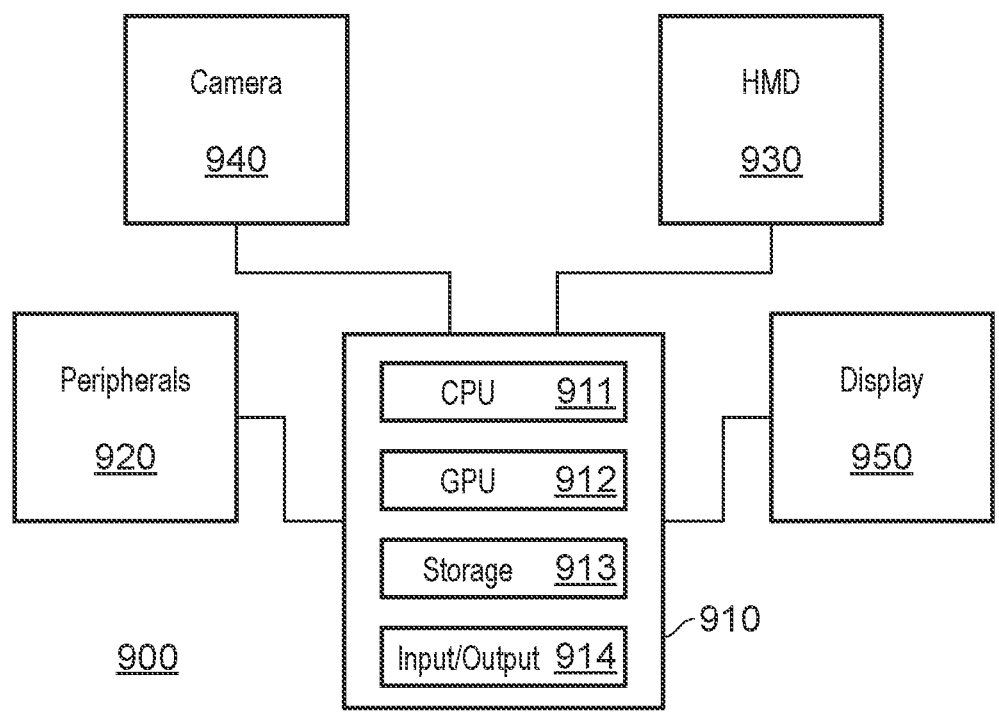
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in response to observed changes in the incident light, as discussed later.

Traditional image-based gaze tracking techniques use standard cameras given that they are widely available and often relatively cheap to produce. 'Standard cameras' here refer to cameras which capture images of the environment at predetermined intervals which can be combined to generate video content. For example, a typical camera of this type may capture thirty image frames each second, and these images may be output to a processing unit for feature analysis or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

As has been discussed above, foveal rendering is a rendering technique that takes advantage of the relatively small size (around 2.5 degrees) of the fovea and the sharp fall-off in acuity outside of that. In other words, such techniques make use of the fact that a user sees only a small portion of an image in high quality, with a sharp drop off of image quality perception outside of that, to render only a portion of an image at a highest level of quality.

Conventional techniques for foveated rendering typically require multiple render passes to allow an image frame to be rendered multiple times at different image resolutions so that the resulting renders are then composited together to achieve regions of different image resolution in an image frame. The use of multiple render passes requires significant processing overhead and undesirable image artefacts can arise at the boundaries between the regions. Alternatively, in some cases hardware can be used that allows rendering at different resolutions in different parts of an image frame without needing additional render passes. Such hardware-accelerated implementations may therefore be better in terms of performance, but this comes with limitations as to the smoothness of the transition between the regions of different image resolution within the image frame. In some implementations, only a limited number of regions can be used and a noticeably sharp drop in image resolution is observed between the regions.

While the above discussion focuses largely on the use of HMDs and foveated rendering, it would be understood that the techniques described below may be implemented using any displays and any method of determining which regions of an image should be presented at a higher level of quality than others. For example, a video game displayed on a television may have a high level of quality for an area corresponding to the user's avatar than for areas of the background; in such an embodiment the display is not an HMD, and the area of high quality can be determined through game context.

In many cases, foveated rendering techniques rely on the rendering of images having a varying image quality and then transmitting these images for display. However, such methods may not be particularly efficient due to the incentive to provide a large foveal region in an image so as to account for a change of the gaze direction of a user between the time of rendering an image and the time of displaying that image. However, reprojection of images generated using foveated rendering can be problematic in that there may be insufficient information in the rendered image to enable such a reprojection to be performed.

Embodiments of the present disclosure mitigate this problem by using an upsampling process to generate higher quality image regions. An example of such a technique is morphological antialiasing (MLAA), which is a post-processing operation that reduces aliasing (that is, the artefacts that can lead to blocky appearance of edges in an image) by smoothing the image where appropriate. This is achieved by blending pixels in an image based upon detected patterns in the image; for instance, pixels may be detected as belonging to a straight line and blending may be performed to smooth this line.

Embodiments of the present disclosure may be implemented as an alternative to flexible rasterizing schemes in which the resolution is varied throughout the display area. However, in some cases embodiments may be implemented in addition to such schemes.

Figure 10:
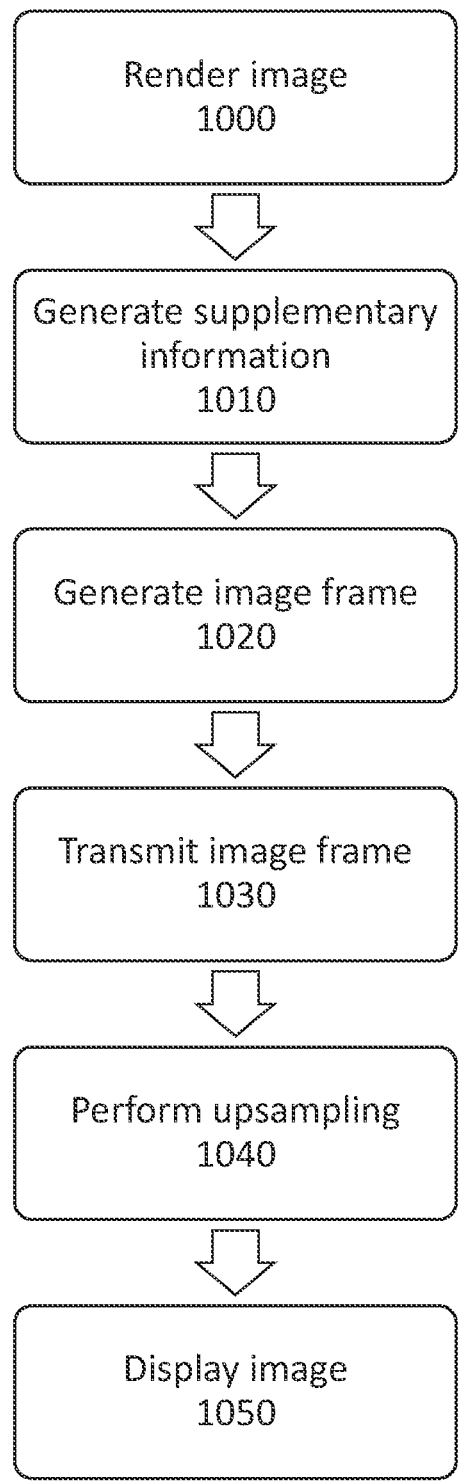
FIG. 10 schematically illustrates method for generating images for display.

FIG. 10 schematically illustrates method for generating images for display in accordance with one or more embodiments of the present disclosure. These images may be images of a game being played by a user, for example.

A step 1000 comprises rendering an image. This image is rendered with a first level of quality, such as a first resolution level, the first level of quality being lower than that which is desired for display at the display device.

A step 1010 comprises generating supplementary information for the images generated in step 1000. This information may be any information that can be used to enhance the effectiveness and/or efficiency of an MLAA process for that image. In some embodiments, the supplementary information may be provided at a different resolution to that of the generated images—this information may then be scaled as appropriate. In some embodiments, this information may be provided by utilising multiple layers with a pixel offset to store the supplementary information so as to increase the effective resolution while maintaining the individual layer resolution.

A first example of such information is that of performing a render pass to generate an image layer comprising edge information for the image. Information about the location of edges and one or more characteristics of those edges (such as a shape and size) may be useful in MLAA as it can assist in indicating both where anti-aliasing processing should be performed and what the target shape is.

A second example of such information is that of performing a render pass to generate an image layer comprising alpha blend mask information. This information may be useful in MLAA as it can assist with the smoothing of edges.

A step 1020 comprises generating a multi-layer image frame comprising the rendered image and supplementary information arranged in respective layers. This image frame may be provided using any suitable format; a format is deemed suitable if it is capable of storing multi-layer image content.

A step 1030 comprises transmitting the image frame; this may be to a display device, such as an HMD, or a separate processing device (such as a cloud gaming server transmitting image frames to a device local to a player) that is associated with a display device. In some embodiments such a step may be omitted, such as if a reprojection process or the like is performed at the image rendering device which directly outputs images for display to a display device.

A step 1040 comprises performing an upsampling process on at least a portion of the rendered image, as extracted from the received image frame. The upsampling is performed using the supplementary information as an input. As discussed above, this upsampling may be performed using an MLAA process. The portion of the image that is upsampled generally corresponds to an area of focus or interest to a user; this can be a foveal region (detected or predicted), or an area corresponding to an object of interest or an event, for example.

For example, step 1040 may comprise the performing of a modified MLAA method in which edge information is obtained from the image layers comprising the supplementary information. This means that the border/edge detection step of the MLAA process comprises obtaining this information rather than processing an image to detect edges based upon colour or depth information.

A step 1050 comprises displaying the upsampled image at a display device. This may be an HMD in some embodiments, although any display device may be used to display the images as appropriate.

The upsampling step 1040 may be performed as a part of a reprojection process for the rendered image, which can also make use of the additional image layers within the image frame. This may be advantageous, as this represents the upsampling being delayed until the latest stage possible—in other words, the latency is reduced. This can enable the upsampled region to be smaller than if the upsampling were performed earlier in the rendering process; this is because the upsampling can then use gaze direction information obtained at a later time (that is, a time closer to the display of the image). Alternatively, the upsampled region can have the same size but with a greater confidence it the accuracy of the location relative to the gaze direction of the user (that is, the process could be considered more robust as the use of later gaze tracking information means that the gaze is more likely to fall within the upsampled region).

Figure 11:
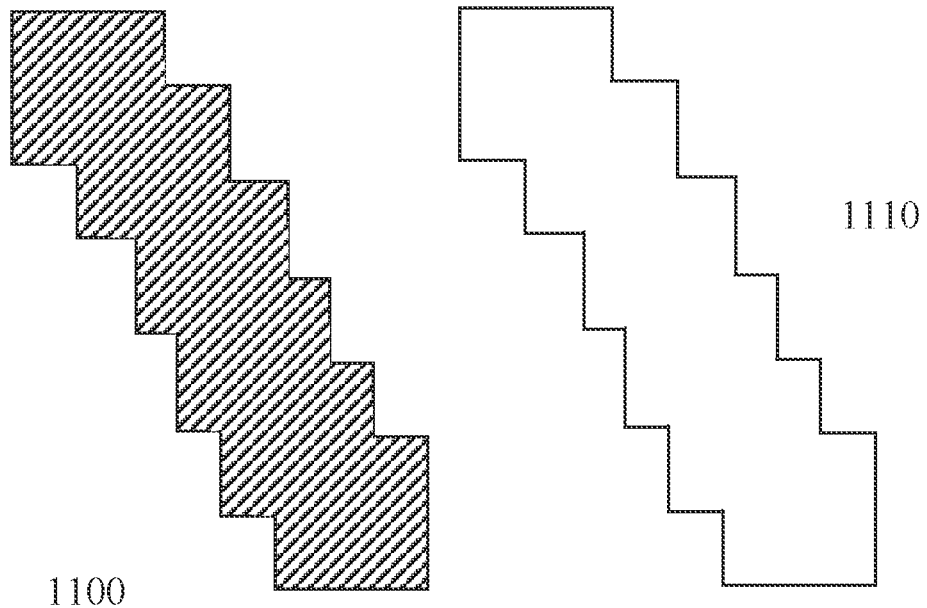
FIG. 11 schematically illustrates simplified examples of a low-resolution rendered image and corresponding edge information.

FIG. 11 schematically illustrates simplified examples of a low-resolution rendered image and corresponding edge information that is generated as supplementary information. The rendered image 1100 is filled to indicate surface detail, such as a texture or pattern that would be displayed in the final image presented to a viewer. Such detail is absent from the edge information 1110, as this is a layer that indicates only the edges of the shape. Each of these images 1100 and 1110 may be stored as a separate layer in a multi-layer image structure as described above.

Figure 12:
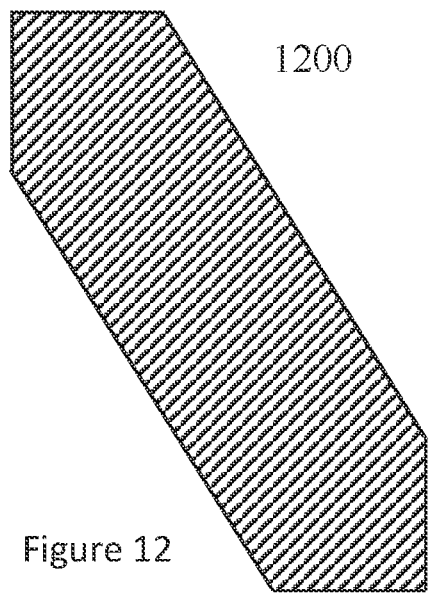
FIG. 12 schematically illustrates an example of an upsampled image.

FIG. 12 schematically illustrates an example of an upsampled image generated from the inputs 1100 and 1110 of FIG. 11. In this image, the surface detail is retained whilst the occurrence of jagged edges (aliasing) is reduced—and thereby the image quality is improved, as the smoother edge is provided rather than the jagged edges.

Figure 13:
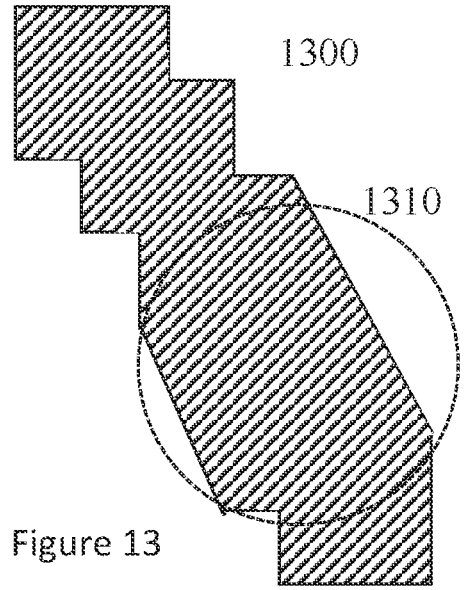
FIG. 13 schematically illustrates another example of an upsampled image.

While these examples are provided in respect of an entire image being upsampled, as noted above the upsampling may be performed in a smaller part of the image. An example of this is shown in FIG. 13, in which the shape 1300 is up sampled in the circle 1310 which represents a point of focus for the user, such as an area corresponding to the foveal region of the user's view. The upsampling is indicated in this example by the use of a diagonal line to replace the jagged edges within the circle 1310. This shape 1300 may also be derived from the same inputs of 1100 and 1110—it is not required that all of the information provided in each layer is utilised.

Figure 14:
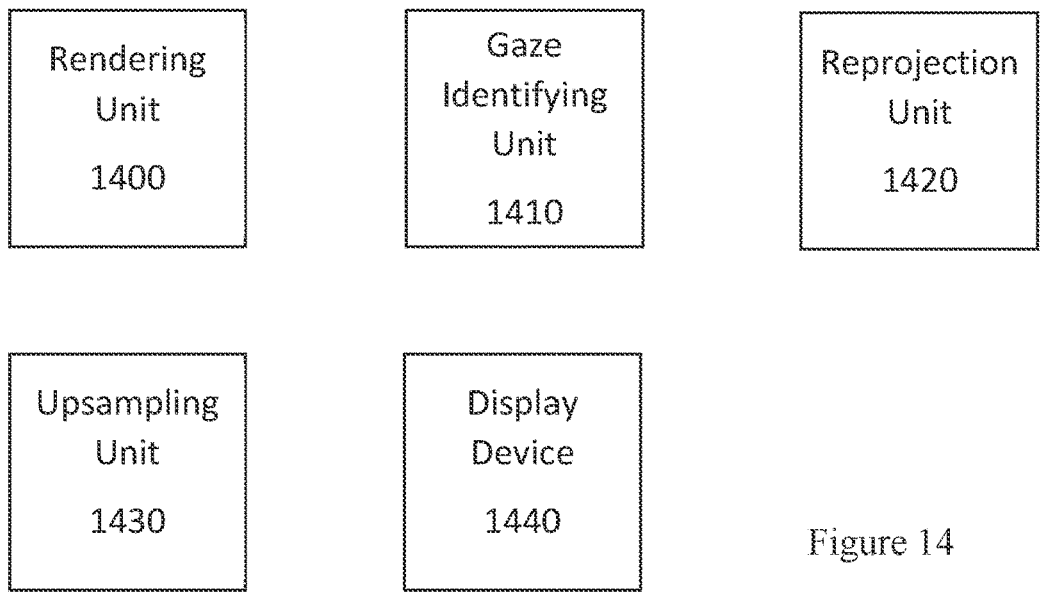
FIG. 14 schematically illustrates a content rendering and display system.

FIG. 14 schematically illustrates a content rendering and display system operable to display content to a viewer, the system comprising a rendering unit 1400, an optional gaze identifying unit 1410, a reprojection unit 1420, an upsampling unit 1430, and a display device 1440. The system may be configured in any suitable manner such that any arrangement of the described units and display device may be utilised.

For instance, in some implementations the rendering unit 1400 is provided at a games console or other processing device (local to or remote from the user). In such implementations the optional gaze identifying unit 1410, reprojection unit 1420, upsampling unit 1430, and display device 1440 may each be embodied in an HMD worn by the user. Alternatively, the reprojection unit 1420 and upsampling unit 1430 may also be located in the games console or other processing device.

In other implementations, the display device may be a television or other display not mounted upon the user's head; in such implementations the gaze tracking unit 1410 may be omitted, provided as a dedicated head-mountable unit, or otherwise present in the user's environment without being head-mounted. The rendering unit 1400, reprojection unit 1420, and upsampling unit 1430 may each be embodied in a games console or the like.

It is also considered that the functionality of any of these units may be distributed amongst different physical units as appropriate for a given implementation. For instance, the gaze tracking functionality may be provided by cameras located at an HMD and processing units which analyse the captured images located at a games console. Similarly, the rendering may be performed in a distributed manner such that most of the rendering is performed at a first device (such as a games console) with other rendering processing (such as reprojection) being performed by a second device (such as an HMD); another exemplary division of rendering processing is that of the first and second devices being a cloud-based processing arrangement and a local processing device respectively.

The rendering unit 1400 is operable to render an image having a first resolution in a first render pass, and to generate supplementary information in additional render passes, wherein the rendered image and the supplementary information are stored in a multi-layer image structure. This multi-layer image structure may be transmitted to a second device, such as an HMD or a second processing device, or may be utilised by a device comprising the rendering unit 1400 as appropriate for a particular embodiment.

The supplementary information generated by the rendering information 1400 comprises edge information for the rendered image. Any other data may be included in the supplementary information as appropriate for a given embodiment; it need not be limited to information for assisting with the upsampling process. To provide an example, in some embodiments the supplementary information also comprises alpha blend mask information for the rendered image.

In some embodiments the supplementary information is generated such that each of the layers in the multi-layer image structure has the same resolution; however, this is not required as the information can be provided with different resolutions. In some cases it may be advantageous to provide a single type of supplementary information using two or more layers having a pixel offset, for instance providing edge information using multiple layers. For example, edge information could be generated using a high resolution rendering pass, with this information being distributed amongst a number of lower-resolution layers. This may be advantageous as the layers could be used together to generate a higher-resolution composite layer that corresponds to the initial high resolution data.

The optional gaze identifying unit 1410 is operable to identify a gaze location of the viewer, wherein the gaze identifying unit comprises one or more cameras operable to capture images of at least one of the viewer's eyes. Such a feature may be considered optional as the gaze location of a viewer may instead be predicted or otherwise derived. For instance, the area for upsampling may be determined based upon contextual clues within a scene or metadata indicating a particular area of interest.

The optional reprojection unit 1420 is provided in embodiments in which reprojection of the rendered images is to be performed prior to display. In such embodiments, the reprojection unit 1420 is operable to perform a reprojection process on the rendered image in accordance with information about an actual or predicted change in the user's viewpoint between rendering and display of the image.

The reprojection unit 1420 may also be configured such that one or more of the layers comprising supplementary information are also reprojected. While in some cases the same reprojection is performed on each layer, in some cases it is considered that one or more of the layers comprising supplementary information are reprojected at a different rate to the rendered image. This rate may also be different for each of the layers of supplementary information.

The upsampling unit 1430 is operable to perform an upsampling process on the rendered image so as to generate an image having a portion at a second resolution higher than the first resolution, wherein the upsampling process comprises a morphological antialiasing process that uses the supplementary information as an input. The image portion having a second resolution corresponds to a foveal region of a viewer, in some embodiments, or may otherwise correspond to a different determined location of interest. The upsampling unit 1430 may also be operable to implement other post-processing effects to improve the quality of the image that is displayed to a viewer.

In some embodiments the reprojection process and upsampling process are performed substantially simultaneously, although this need not be the case and a more sequential operation may be performed. For instance, if the upsampled area is large enough then the reprojection could be performed after the upsampling without a significant impact on the viewing experience as the reprojection amount may be smaller than the 'excess' size of the upsampled area (the excess size being the difference between the upsampled area size and the foveal region size for a user, for instance).

In some embodiments, the first resolution comprises a resolution gradient such that different portions of the rendered image have different resolutions, and wherein the second resolution is higher than the first resolution at the location of the corresponding image portion in the rendered image. This resolution gradient may be generated using hardware and/or software implementations as desired.

The display device 1440 is operable to display the upsampled image to a viewer. This may be performed using any suitable display device, which can include an HMD or a television for example.

The arrangement of FIG. 14 is an example of a processor (for example, a GPU and/or CPU located in a games console or any other computing device) and display that are together operable to render and display content to a viewer, and in particular is operable to: render an image having a first resolution in a first render pass, and to generate supplementary information in additional render passes, wherein the rendered image and the supplementary information are stored in a multi-layer image structure; perform an upsampling process on the rendered image so as to generate an image having a portion at a second resolution higher than the first resolution, wherein the upsampling process comprises a morphological antialiasing process that uses the supplementary information as an input; and display the upsampled image, wherein the supplementary information comprises edge information for the rendered image.

Figure 15:
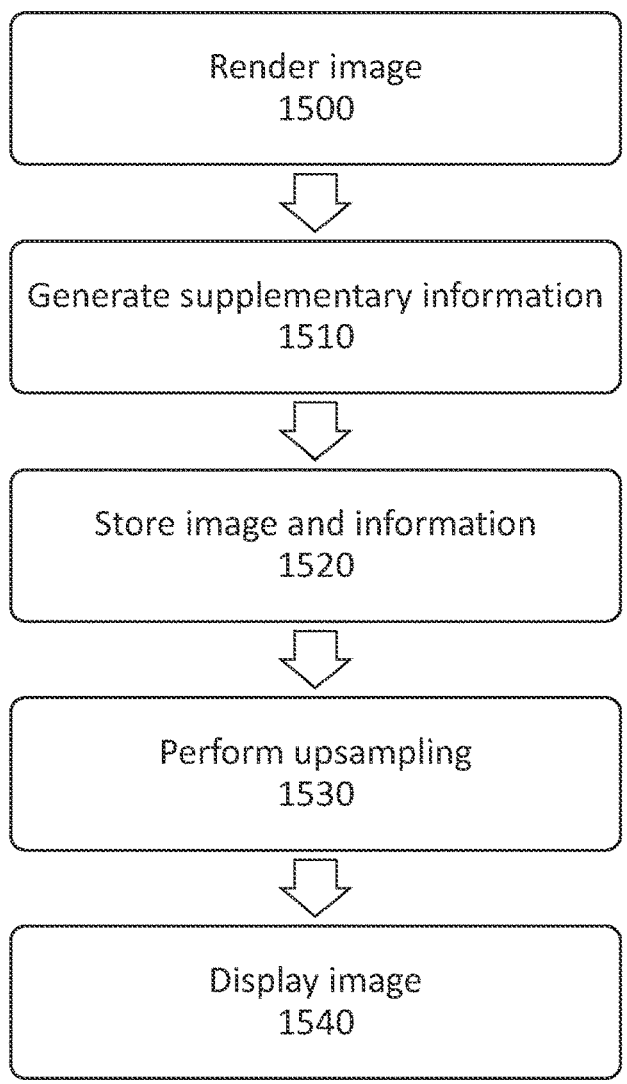
FIG. 15 schematically illustrates a content rendering and display method.

FIG. 15 schematically illustrates a content rendering and display method operable to display content to a viewer.

A step 1500 comprises rendering an image having a first resolution in a first render pass.

A step 1510 comprises generating supplementary information in additional render passes, wherein the supplementary information comprises edge information for the rendered image.

A step 1520 comprises storing the rendered image and the supplementary information in a multi-layer image structure.

A step 1530 comprises performing an upsampling process on the rendered image so as to generate an image having a portion at a second resolution higher than the first resolution, wherein the upsampling process comprises a morphological antialiasing process that uses the supplementary information as an input.

A step 1540 comprises displaying the upsampled image.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A content rendering and display system operable to display content to a viewer, the system comprising: a rendering unit operable to render an image having a first resolution in a first render pass, and to generate supplementary information in additional render passes, wherein the rendered image and the supplementary information are stored in a multi-layer image structure; an upsampling unit operable to perform an upsampling process on the rendered image so as to generate an image having a portion at a second resolution higher than the first resolution, wherein the upsampling process comprises a morphological antialiasing process that uses the supplementary information as an input; and a display device operable to display the upsampled image, wherein the supplementary information comprises edge information for the rendered image.
2. A system according to clause 1, wherein the image portion having a second resolution corresponds to a foveal region of a viewer.
3. A system according to any preceding clause, wherein each of the layers in the multi-layer image structure has the same resolution.
4. A system according to any preceding clause, wherein a single type of supplementary information may be provided using two or more layers having a pixel offset.
5. A system according to any preceding clause, comprising a reprojection unit operable to perform a reprojection process on the rendered image.
6. A system according to clause 5, wherein one or more of the layers comprising supplementary information are also reprojected.
7. A system according to clauses 6, wherein one or more of the layers comprising supplementary information are reprojected at a different rate to the rendered image.
8. A system according to any of clauses 5-7, wherein the reprojection process and upsampling process are performed substantially simultaneously.
9. A system according to any preceding clause, wherein the supplementary information also comprises alpha blend mask information for the rendered image.
10. A system according to any preceding clause, wherein the first resolution comprises a resolution gradient such that different portions of the rendered image have different resolutions, and wherein the second resolution is higher than the first resolution at the location of the corresponding image portion in the rendered image.
11. A system according to any preceding clause, comprising a gaze identifying unit to identify a gaze location of the viewer, wherein the gaze identifying unit comprises one or more cameras operable to capture images of at least one of the viewer's eyes.
12. A system according to any preceding clause, wherein the display device is a head-mountable display.
13. A content rendering and display method operable to display content to a viewer, the method comprising: rendering an image having a first resolution in a first render pass; generating supplementary information in additional render passes, wherein the supplementary information comprises edge information for the rendered image; storing the rendered image and the supplementary information in a multi-layer image structure; performing an upsampling process on the rendered image so as to generate an image having a portion at a second resolution higher than the first resolution, wherein the upsampling process comprises a morphological antialiasing process that uses the supplementary information as an input; and displaying the upsampled image.
14. Computer software which, when executed by a computer, causes the computer to carry out the method of clause 13.
15. A non-transitory machine-readable storage medium which stores computer software according to clause 14.

The invention claimed is:

1. A content rendering and display system operable to display content to a viewer, the system comprising:
   a rendering unit operable to render an image having a first resolution in a first render pass, and to generate supplementary information in additional render passes, wherein the rendered image and the supplementary information are stored in a multi-layer image structure;
   an upsampling unit operable to perform an upsampling process on the rendered image so as to generate an image having a portion at a second resolution higher than the first resolution, wherein the upsampling process comprises a morphological antialiasing process that uses the supplementary information as an input; and
   a display device operable to display the upsampled image, wherein the supplementary information comprises edge information for the rendered image.

2. The system of claim 1, wherein the image portion having a second resolution corresponds to a foveal region of a viewer.

3. The system of claim 1, wherein each of the layers in the multi-layer image structure has the same resolution.

4. The system of claim 1, wherein a single type of supplementary information may be provided using two or more layers having a pixel offset.

5. The system of claim 1, comprising a reprojection unit operable to perform a reprojection process on the rendered image.

6. The system of claim 5, wherein one or more of the layers comprising supplementary information are also reprojected.

7. The system of claim 6, wherein one or more of the layers comprising supplementary information are reprojected at a different rate to the rendered image.

8. The system of claim 5, wherein the reprojection process and upsampling process are performed substantially simultaneously.

9. The system of claim 1, wherein the supplementary information also comprises alpha blend mask information for the rendered image.

10. The system of claim 1, wherein the first resolution comprises a resolution gradient such that different portions of the rendered image have different resolutions, and wherein the second resolution is higher than the first resolution at a location of the corresponding image portion in the rendered image.

11. The system of claim 1, comprising a gaze identifying unit to identify a gaze location of the viewer, wherein the gaze identifying unit comprises one or more cameras operable to capture images of at least one of the viewer's eyes.

12. The system of claim 1, wherein the display device is a head-mountable display.

13. A content rendering and display method operable to display content to a viewer, the method comprising:
   rendering an image having a first resolution in a first render pass;
   generating supplementary information in additional render passes, wherein the supplementary information comprises edge information for the rendered image;
   storing the rendered image and the supplementary information in a multi-layer image structure;
   performing an upsampling process on the rendered image so as to generate an image having a portion at a second resolution higher than the first resolution, wherein the upsampling process comprises a morphological antialiasing process that uses the supplementary information as an input; and
   displaying the upsampled image.

14. A non-transitory machine-readable storage medium which stores computer software which, when executed by a computer, causes the computer to perform a content rendering and display method operable to display content to a viewer, the method comprising:
   rendering an image having a first resolution in a first render pass;
   generating supplementary information in additional render passes, wherein the supplementary information comprises edge information for the rendered image;
   storing the rendered image and the supplementary information in a multi-layer image structure;
   performing an upsampling process on the rendered image so as to generate an image having a portion at a second resolution higher than the first resolution, wherein the upsampling process comprises a morphological antialiasing process that uses the supplementary information as an input; and
   displaying the upsampled image.

* * * * *